Sept. 13, 1966

L. H. GODDARD 3,272,290

ELECTROMAGNETIC DEVICE

Filed Oct. 31, 1957

2 Sheets-Sheet 1

INVENTOR.
LOUIS H. GODDARD

BY *Milton E. Gilbert*

*HIS ATTORNEY*

Sept. 13, 1966 L. H. GODDARD 3,272,290
ELECTROMAGNETIC DEVICE
Filed Oct. 31, 1957 2 Sheets-Sheet 2
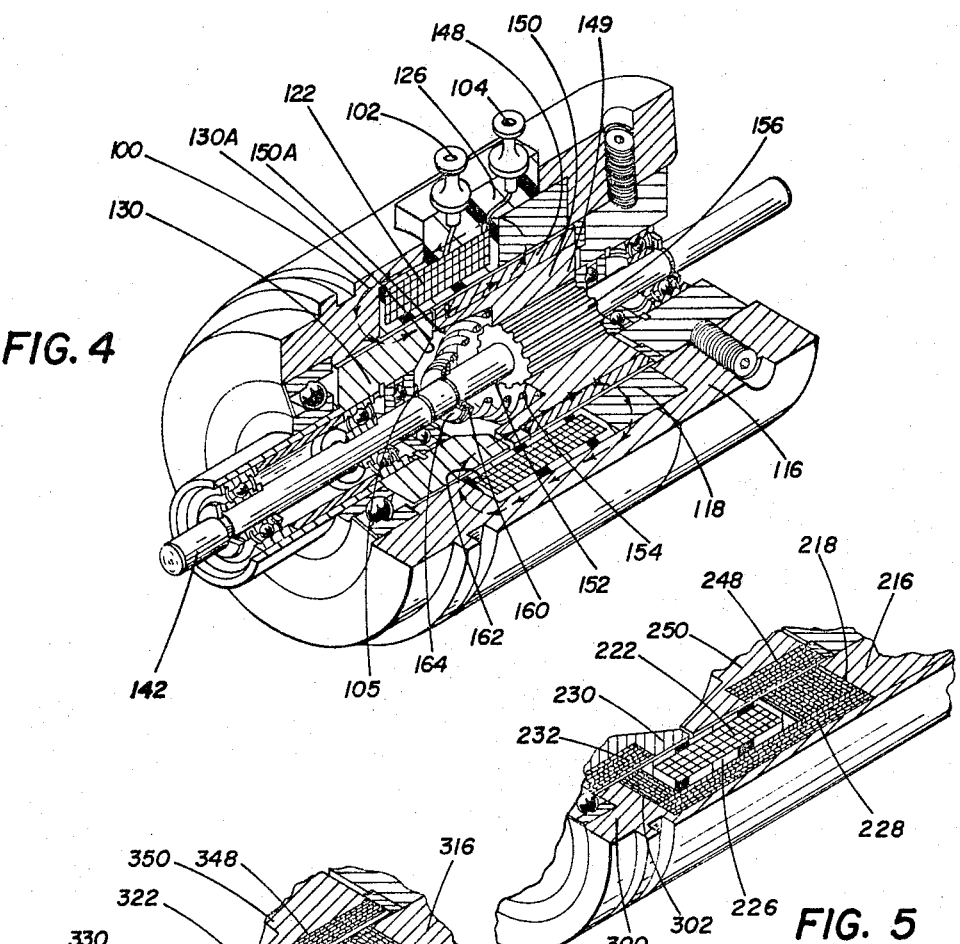
FIG. 4
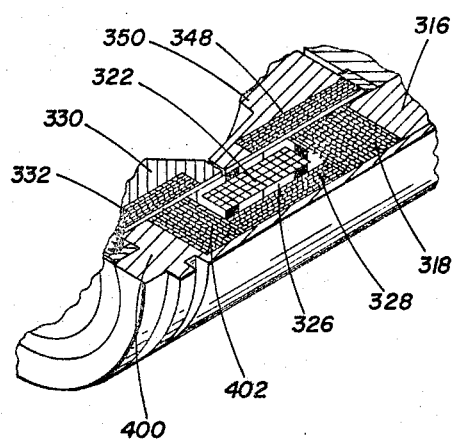
FIG. 6
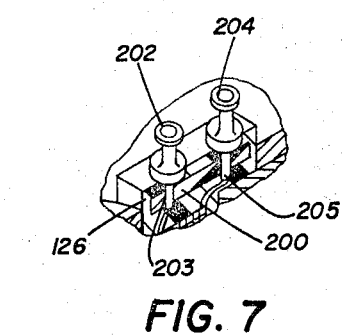
FIG. 5
FIG. 7
INVENTOR.
LOUIS H. GODDARD
BY William E. Gilbert
ATTORNEY

United States Patent Office 3,272,290
Patented Sept. 13, 1966

3,272,290
ELECTROMAGNETIC DEVICE
Louis H. Goddard, Dayton, Ohio, assignor to Globe Industries, Inc., Dayton, Ohio, a corporation of Ohio
Filed Oct. 31, 1957, Ser. No. 693,742
24 Claims. (Cl. 192—18)

This application is a continuation-in-part of my prior application Serial No. 505,968, filed May 4, 1955, now abandoned.

This invention relates to a magnetic clutch and a brake assembly and more particularly to a magnetic clutch that is very sensitive, so that it responds promptly to the energization of a magnetic coil that may be energized with a comparatively small current, although not necessarily so limited.

An object of this invention is to provide a magnetic clutch that is fast in operation, and that has low inertia of the moving parts. Another object is to provide a magnetic clutch that is accurate in alignment, whereby the engaging surfaces are concentric and form close contact throughout the entire surfaces. A further object is to provide a magnetic clutch assembly having a concentric shaft extending throughout the entire assembly, resulting in greater stability. Still another object is to provide a magnetic clutch-brake assembly wherein the braking action does not induce angular displacement and wherein a structure is provided where no slip rings and brushes are used. A still further object of the invention is to provide a clutch, the several components of which have minimum response time, and wherein the input and output components are so constructed and arranged that no drag is imparted to the plunger by the spring loading it.

Figure 1:
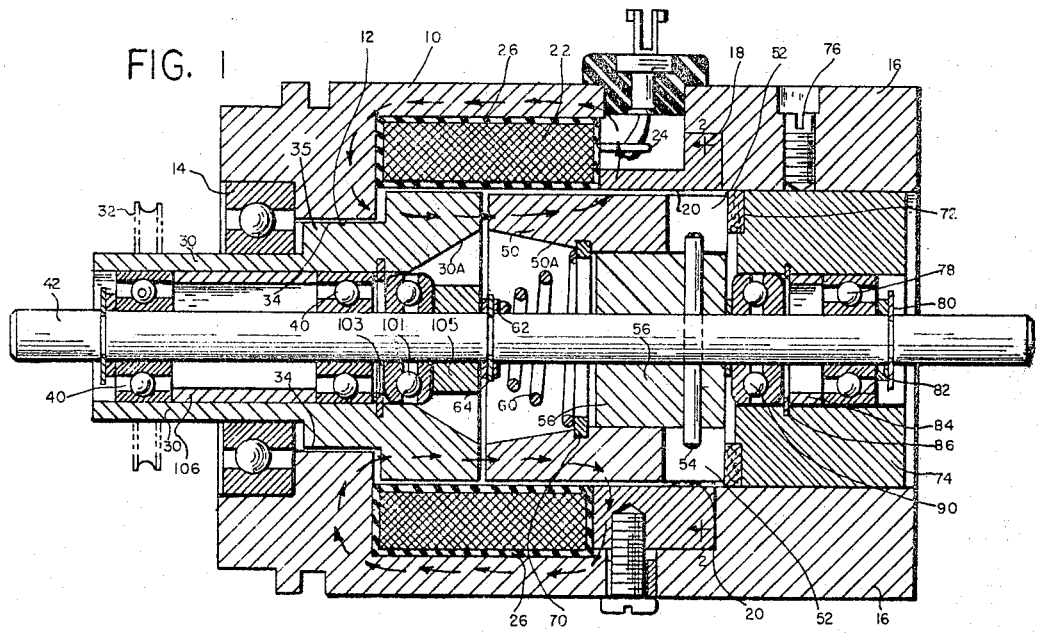
Figure 3:
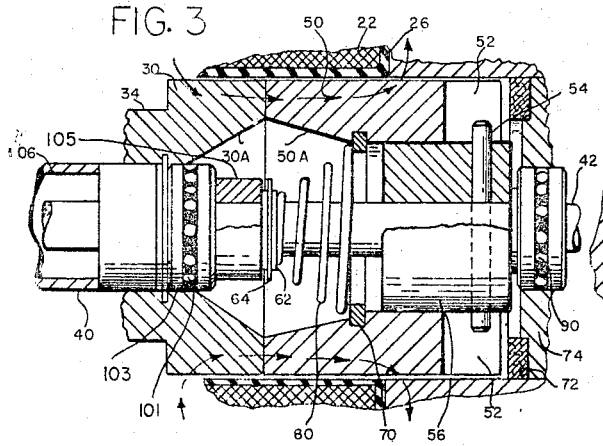
Figure 2:
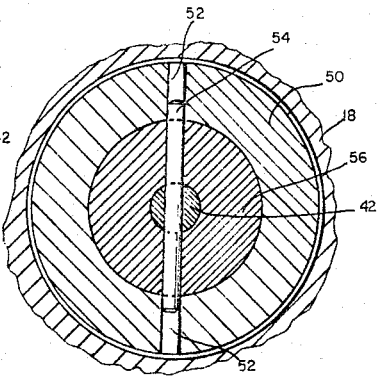

Other objects and advantages reside in the construction of parts, the combination thereof and the mode of operation, as will become more apparent from a reading of the following description, and an examination of the drawings, in which:

FIGURE 1 is a longitudinal cross sectional view of the magnetic clutch and brake assembly, FIGURE 2 is a cross sectional view taken substantially on the section line 2—2 of FIGURE 1, FIGURE 3 is a fragmentary view of a portion of the assembly shown in FIGURE 1, with parts shown in section, FIGURE 4 is a perspective view, partially in cross-section of a preferred modification of the magnetic clutch and brake assembly of the invention, FIGURES 5 and 6 are partial views similar to FIGURE 4 showing modified construction of the flux path, and FIGURE 7 is a partial perspective view of a modification of the terminal post sub-assembly.

In order to lower the mass of the plunger or movable member of the clutch-brake assembly and obtain a fast acting clutch I have determined that a bearing sleeve should be interposed between the output shaft and the movable clutch member. This bearing sleeve or spacer is mounted on the output shaft and the movable clutch member. This bearing sleeve or spacer is mounted on the output shaft and affixed thereto so that it does not have to be accelerated and moved linearly with the plunger. The bearing sleeve may be of magnetic or of non-magnetic material, since its arrangement in the unit is such that it is out of the flux path. In addition, the spring which loads the plunger is so mounted in the unit that it does not permit friction torque or drag to be interposed between the input member and armature and thus mechanically isolates the two elements as regards force transmission, i.e., the spring is completely divorced mechanically from the input member.

Referring to FIGURE 1, the clutch assembly includes a main housing 10 of magnetic material having an accurately machined cylindrical surface 12 adjacent a bearing 14. One end of the housing is closed by a non-magnetic end member 16 containing magnetic ring 18 accurately positioned with respect to the magnetic housing 10. The magnetic ring 18 is press-fitted into the end member 16 and in addition thereto, it may be held in position by radial pins (not shown). The magnetic ring 18 has an accurately machined inner surface 20. A magnetic coil or solenoid is mounted in the main housing 10 and is provided with a pair of protruding terminals 24, only one of which has been shown. The coil 22 is entirely encapsulated within a plastic insulating compound 26. The coil is surrounded by a magnetic circuit including both stationary and movably mounted magnetic members.

A hollow or tubular drive shaft 30, driven in any suitable manner, as for example, through a V-belt pulley 32, is mounted in the roller bearing 14 and has an external surface 34 that cooperates with the surface 12 to provide a very small air gap 35 between the two parts (dimension in drawing is exaggerated for clarity). This hollow drive shaft 30 is also mounted on a pair of bearings 40 having their inner races mounted upon a driven shaft 42 extending throughout the length of the clutch assembly, so that the bearings 14 and the bearings 40 accurately center at the tubular drive shaft 30 with respect to the housing 10. This structure allows for very small clearance between the surfaces 12 and 34, so as to hold the air gap to a minimum.

The magnetic circuit, including the magnetic housing or frame 10 and the tubular shaft or armature 30, is completed by a light weight hollow magnetic sleeve or plunger 50, having low magnetic retentivity, and the magnetic ring 18. The hollow magnetic sleeve 50 is light in weight and also because of its dimensions has a low moment of inertia consistent with the required torque transmission. This low moment of inertia coupled with the use of the bushing 56 enables the sleeve 50 to be translated quickly. This sleeve 50 is provided with a pair of diametrically disposed and axially aligned slots 62, in which is mounted a pin or key 54 extending transversely through a bushing 56 (which may be of magnetic or non-magnetic material) mounted upon the shaft 42. From this it may readily be seen that the sleeve 50 has free axial movement with respect to the pin 54. However, when the sleeve 50 rotates, it drives the shaft 42 with it, as will be more fully described later. The sleeve 50 is accurately positioned with respect to the air gap between it and the magnetic ring 18.

The spacing member or bushing 56 accurately positions the sleeve 50 with respect to the air gap of the magnetic parts surrounding the sleeve. In addition to positioning the sleeve with respect to the air gap, the bushing 56 also provides a smooth surface and a substantially anti-friction surface for the axial movement of the sleeve 50.

It is well known that the flux pattern around two bar magnets when opposite poles are placed adjacent and separated by a small air gap, consists primarily of two distinct paths. One path flows directly across the air gap between the magnets in their longitudinal direction (i.e., the main flux path) and the other path fringes the air gap is semi-toroidal in configuration. The flux across this fringing path is designated as leakage flux. When employing magnets in a clutch of small configuration where actuation and deactivation time together with torque transmission are critical factors, the leakage flux path will determine whether the unit can assume the limited dimensions available to it in the system of which it forms one component, and still be able to meet the predetermined performance requirements. Since flux density is directly proportional to the flux but indirectly proportional to the area, the flux density will be greater if the section area at the clutch engaging faces is reduced. I have determined that by making the engaging surfaces of the shaft 30 and sleeve 50 of a tapered or frusto-conical shape, then the section of the magnet adjacent the main flux path will be at a greater flux density than the section above it adjacent the leakage flux path. Consequently, the amount of leakage flux will be reduced. Therefore, whereas in previously known clutches of the type with which the instant invention is concerned, cylindrical shaped members were used for the mating magnetic clutching members, the clutch as shown in FIGURE 1, for example, has inclined surfaces 50a on the sleeve 50 and 30a on the shaft 30 which reduce leakage flux and also further minimize the mass of the movable member 50.

As indicated above, a spring 60 is used to load the sleeve 50, and is so mounted that the sleeve 50 and armature 30 are mechanically isolated as regards force transmission through the spring. The spring 60 is positioned between a shim 62 and a snap ring 64 seated in a groove in the shaft 42 on one side and a snap ring 70 on the other side, located in an annular groove in the interior surface of the tubular sleeve 50. It may readily be seen from this that when the magnetic circuit is not energized, the spring 60 biases the sleeve 50 to the right, as viewed in FIGURE 1, into engagement with a brake lining 72 mounted in a rabbet in a bearing ring 74. This bearing ring is held in position by a suitable set screw 76, threadedly engaging the non-magnetic member 16. This bearing ring 74 has mounted therein a bearing 78 in which the shaft 42 is journalled. A snap ring 80 is seated in an annular groove in the shaft 42. A shim or shims 82 may be positioned between the snap ring 80 and the bearing 78. The outer race of the bearing 78 abuts an annular ring 84 engaging a snap ring 86 located in an internal groove in the bearing ring 74. End thrust bearings 90 are positioned between the snap ring 86 and the bushing 56, as best seen in FIGURE 1. An end thrust bearing 101 abuts a snap ring 103 seated in an internal groove in the tubular drive shaft 30. A collar or bushing 105 is positioned between the end thrust bearing 101 and a suitable shim placed between the snap ring 64 and the bushing 105. A tubular sleeve 106 is positioned between the two bearings 40 (to abut the outer races thereof), and is mounted within the tubular shaft 30 to rotate therewith.

Whenever the tubular shaft 30 is driven from a suitable source of power and the coil 22 is energized, the tubular sleeve 50 snaps from the position shown in FIGURE 1 into the position shown in FIGURE 3. In other words, it is magnetically attracted into engagement with the clutching surface of the tubular shaft 30. The clutching surfaces extend normal to the axis of rotation of the shaft 42. As soon as the sleeve 50 engages the clutching face on the tubular shaft 30, the sleeve 50 rotates with the tubular shaft 30 and thereby drives the shaft 42 through the pin 54. Immediately upon the coil 22 being de-energized, the sleeve 50 is snapped to the right, as viewed in FIGURE 1, into engagement with the brake lining 72, thereby immediately applying a braking force to the sleeve 50, the shaft 42 and the parts driven thereby.

The clutch readily lends itself for use in a servo system. The shaft 30 may then be driven constantly in one direction by a servo motor and whenever it is desired to rotate the shaft 42, an appropriate signal automatically closes the circuit through the coil 22. As soon as the signal disappears the coil 22 is de-energized and the brake arrests the movement of the shaft 42 and the parts driven thereby, so that this magnetic clutch may be used whenever accurate and critical control is essential.

Due to the shaft 42 extending continuously throughout the length of the clutch mechanism, very close tolerances are possible as far as the air gaps are concerned, thereby obtaining a very efficient magnetic clutch mechanism that operates in response to very small currents and, at the same time, is dependable, accurate and strong.

Due to the fact that the clutching surfaces are removed a considerable distance from the axis of rotation, a small clutching surface may be used for delivering a considerable amount of power, in that the area of clutching contact is relatively large.

FIGURE 4 indicates the preferred embodiment of the invention. The configuration of the clutch-brake is generally similar to that shown in FIGURES 1–3, and several of the elements which are identical to those shown in FIGURES 1–3 are not numbered in FIGURE 4. The following description concerns the features of construction which differentiate the embodiment of FIGURE 4 from the previously described embodiment. The pin 54 and slot 52 connection of the embodiment of FIGURE 1 is replaced in the embodiment of FIGURE 4 by a spline connection. The spacer 156 has formed on its outer periphery the splines 154; and the plunger 150 has formed internally thereof mating splines 152. The use of the spline connection enables a more accurate dimensioning of the plunger 150 and spacer 156, since the ability to hold minimum error in cutting a spline is as readily attainable as the ability to cut a gear accurately. In the pin and slot arrangement of FIGURE 1, the accuracy of the connection was dependent upon the ability to accurately position the pin 54 into a hardened shaft 42, which presents some difficulty. Thus, the dimensioning and control of dimensioning of these parts is more readily adapted in production to the use of a spline connection. In addition, the spline has better fatigue characteristics than the pin. In tests which I have run, I have determined that although the pin will not fracture until about 90,000 cycles have been run, the spline has withstood an excess of 1,000,000 cycles with no fatigue being evident.

As indicated above, the clutch assembly of FIGURE 4 is generally similar to that of FIGURES 1–3, and includes a main housing 100 of magnetic material; one end of the housing being closed by a non-magnetic end number 116 which contains a magnetic ring 118 (which is positioned with respect to the magnetic housing 100). The coil or solenoid 122 is mounted within the housing 100 and is entirely encapsulated within a plastic insulating compound 126. As shown in FIGURE 4, the terminals of the coil 122 are connected to terminal posts 102 and 104. These terminal posts are embedded within the same encapsulating compound that surrounds the coil 122.

The construction shown in FIGURE 1 concerning the method of encapsulating the coil 22 and connecting the terminal 24 to its terminal post involves several operations and requires a relatively lengthy time in assembly. This shortcoming is overcome by the construction shown in FIGURE 4 wherein the coil and terminal posts are encapsulated as one single unit and assembled into the clutch housing 100 in a single operation. In addition, where it is desired that the terminal posts 102 and 104 be made more rigid so as to prevent their becoming loose in the event they are subjected to lengthy heating during a soldering operation, the posts may be stiffened within the encapsulating material in the manner shown in FIGURE 7. The encapsulating compound 126 (see FIGURE 7) has embedded within it a terminal board 200 through which the terminal posts 202 and 204 extend. The lower extremities of the posts 202 and 204 are crimped, or beaded or otherwise formed into the flange portions 203 and 205, respectively, to retain the posts in predetermined spaced mounted relationship upon the board 200. The terminal board 200 and the posts 202 and 204 are made integral with the coil by being potted in the plastic material together with the coil 122. The board 200 is of electrically insulating material and has sufficient strength to withstand prolonged heating and mechanical forces transmitted to it by assembly operations involving the terminal posts.

A spring 160 is used to load the sleeve 150, and is so mounted that the sleeve 150 and the armature or shaft 130 are positively mechanically isolated as regards force transmission through the spring. Although the construction shown in FIGURE 1 will also accomplish this purpose, the construction shown in FIGURE 4 positively removes any possibility of force being transmitted through the thrust bearings to the input member, shaft 130. The spring 160 is positioned between a shim 162 and snap ring 164 on one side and a portion of the sleeve 150 on the other side. The spring 160 biases the sleeve 150 into engagement with a brake lining as in the embodiment of FIGURE 1, when the magnetic circuit is not energized. When the magnetic circuit is energized, the spring 160 is compressed since the sleeve 150 is drawn towards the sleeve 130. However, no force is transmitted through the spring back to the shaft 130 since the spring is separated or spaced from proximity to the shaft 130 or any member in mechanical force transmissive contact therewith.

The thrust bearings for the shaft 130 are retained in position by a snap ring 105 seated within a groove on the shaft 142.

Where two magnetic surfaces are required to come into contact and serve as the surfaces between which a considerable amount of friction will occur during force transmission therebetween, it is desirable that the material of the surfaces be dissimilar. If iron is used for both surfaces then they will gall and scar and generally present problems in operation. In order to overcome this shortcoming I have employed a construction whereby the mating surfaces of the clutch are of dissimilar material. The sleeve 150 is made into two component parts, 148 and 149, which are bonded together. The part 149 is made from powdered iron or other magnetic material which has desirable frictional properties, i.e., its coefficient of friction and wear-resistant properties are such that it will stand up well in use. The part 148, on the other hand, is a magnetic material of high permeance. Even though the saturation density of the material comprising the part 149 is below that of the part 148, it will still conduct some flux. The bond between the two elements 138 and 149 is not placed in shear when the two elements 130 and 150 are in engagement, since the part 148 fits within a recessed portion of the part 149; the latter providing a continuous surface between the engaging face and the output spline connection. The part 148 can therefore be termed a magnetic sleeve which is placed around the outer circumference of the part 149, which serves as the mechanical force transmitting portion of the composite sleeve 150. The flux path is indicated by the arrows in FIGURE 4 and it stays within the outer periphery of the composite sleeve 150. When the coil 122 is actuated and the composite sleeve is drawn into engagement with the member 130, the torque is transmitted through the shaft 149. The bond between the members 148 and 149 is not stressed during this clutching action, and when the coil 122 is de-activated the brake is applied substantially entirely to the magnetic material 148.

As indicated above, the clutch-brake of the invention has desirable application in a servo system. The prime criteria of a servo-system employing such a clutch-brake is the ability of the output member of the clutch to accurately follow the input member with a minimum of delay. It is therefore imperative that the separate components of the clutch-brake have a minimum response time. This criteria regarding the clutch-brake may be designated as the figure of merit. The figure of merit may be expressed as $T/J$. In instrument applications this figure of merit should be high, so that there should be a high torque (T) for a given inertia (J). Since $T/J$ is equal to acceleration, the factors which affect acceleration in clutches, must be considered in determining the requirements for the configuration of such clutches. The time required for the output shaft of the clutch to accelerate to full speed may be considered as the sum of three separate times: (1) the time required for current build-up, which is controlled by the coil time constant $(L/R)$ and is influenced by the magnetic circuit, (2) the plunger translation time, or the time required for the movable member of the clutch or plunger to close the working air gap (this function of the magnet force, the plunger mass and the distance to be traversed), and (3) the plunger rotational time, or the time required for the driven member of the clutch to assume the speed of the driving member after the members have established contact (this is a function of clutch torque, the combined load and clutch inertia, and the shaft speed).

At the inception of the command or signal, the coil current will begin to build up and the flux will build up similarly. Since flux produces force, the driven member of the clutch will begin to move when the magnet force is slightly in excess of the plunger bias spring force. Closure of the plunger upon the driving member of the clutch will be rapid since the force continues to build up once the signal commences. The plunger or driven member of the clutch will slip at the instant of contact and the slip velocity will decrease to zero when both discs are running at the same speed. In order to obtain high-speed operation of the clutch the flux build-up must be done in a minimum time so that the force transmitted by the clutch will be greatest. Flux build-up is influenced not only by the size of the air gaps in the magnetic circuit (high-speed response requires a minimum number of air gaps), but also the presence of any eddy currents in the magnetic circuit. I have therefore determined that in the clutch-brake of the invention it is extremely desirable in high-speed applications, to so construct the magnetic circuit that any eddy currents are minimized. As shown in FIGURES 5 and 6 this is accomplished by laminating portions of the magnetic circuit. Since eddy currents flow at right angles to the flux lines, I have determined that if laminated elements are employed in the magnetic circuit, and they are arranged in such a manner that they are parallel with the flux flow, then the amount of eddy currents will be substantially reduced or eliminated. As indicated both in FIGURES 5 and 6 the magnetic circuit appears as a rectangle in cross-sectional view. As shown in FIGURE 5 the movable member of the clutch 250 has embedded within it a series of concentric rings, or a spiral wrap 248 which replaces the permeable ring 148 of the unit of FIGURE 4. Similarly, the driving member of the clutch 230 has embedded within it the spiral wrap 232. The laminations of this wrap extend parallel to the lines of flux flow. Similarly the outer annulus 228 could be a series of concentric rings or a spiral wrap. The other sides of the flux path may simply be formed by a series of washers 218 and 302. These portions may be arranged in the manner shown in FIGURE 5 wherein the spiral wraps 248 and 228 overlap the edge portions of the series of washers 218, and the spiral wraps 228 and 232 overlap the edge portions of the series of washers 302; or else the arrangement shown in FIGURE 6 may be used. In FIGURE 6 the series of washers 318 and the series of washers 402 overlap the ends of the spiral wrap 328; whereas the spiral wraps 332 and 348 butt against the edges of the series of washers 402 and 418. Although only two arrangements of the respective positionings of the washers and spiral wraps are shown, various other modifications and arrangements may be made, and it is possible that when certain specific requirements are to be made one arrangement or the other arrangement may be more desirable. As shown in the FIGURES 5 and 6 substantially every portion of the magnetic circuit may be laminated, and only the face areas of the two clutch members are not laminated, since it is desirable that they have the wear resisting properties which only a solid material can offer.

By employing the laminations as shown in FIGURES 5 and 6, the magnetic circuit is divided into a number of cells or enclosures beyond which eddy currents cannot flow. Therefore, the various laminated portions of the circuit should not be subjected to any fabricating operations since by doing so it may result in providing a short circuit in several of the laminations. For the same reason the face areas on the clutch are not laminated.

Although this magnetic clutch assembly has been shown as having considerable diameter, in actual use the outer diameter may be on the order of one inch (1") or less, resulting in a very small, compact, reliable unit.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims. For example, the device may be used in an A.C. circuit as well as a D.C. circuit, and still employ the novel features of the invention.

What I claim is:

1. An electromagnetic clutch assembly including magnetic circuit means comprising a coil adapted to carry current therethrough, a driving clutch member and a driven clutch member magnetically linked with said coil so that the clutching faces of said members are in the flux path of the coil, a driven shaft fixed against axial movement, a bushing mounted on said shaft, said driving and driven clutch members having at least a portion of each thereof of magnetic material, said driven clutch member being in the form of a sleeve mounted on said bushing and having a low moment of inertia consistent with obtaining a high relative flux path, and thereby a high torque, and being coupled to said driven shaft for rotational movement therewith but being free for translational movement with respect thereto.

2. The electromagnetic clutch assembly of claim 1, wherein said clutch members are provided with frusto-conical shaped portions tapering outwardly from their clutching faces.

3. An electromagnetic clutch assembly including magnetic circuit means comprising a coil adapted to carry current therethrough, a driving clutch member and a driven clutch member magnetically linked with said coil so that the clutching faces of said members are in the flux path of the coil, a driven shaft extending through both clutch members, said driving and driven clutch members having at least a portion of each thereof of magnetic material, said driving clutch member being mounted so as to rotate with respect to said shaft but not translate with respect thereto, said driven clutch member being coupled to said driven shaft for rotational movement therewith but being free for translational movement with respect thereto, resilient means for biasing the driven clutch member away from the driving clutch member, means on said shaft associated with said resilient means for positively mechanically disassociating the resilient means from force transmissive relationship with the driving clutch member.

4. The electromagnetic clutch assembly of claim 3 wherein said last named means comprises a rigid member locked to said shaft at a location spaced from the mounting location of the driving clutch member and any other element in mechanical contact therewith, whereby said resilient means maintains the driven clutch member out of contact with the driving clutch member until said coil is actuated.

5. An electromagnetic clutch assembly including magnetic circuit means comprising a coil adapted to carry current therethrough, a driving clutch member and a driven clutch member magnetically linked with said coil so that the clutching faces of said members are in the flux path of the coil, said driving and driven clutch members having at least a portion of each thereof of magnetic material, substantially the entire path of flux flow in said magnetic circuit being formed by thin laminations of magnetic material extending in the direction of flux flow, whereby magnetic eddy currents in said magnetic path are substantially reduced.

6. The assembly of claim 5 wherein said flux path is substantially rectangular in configuration when viewed on a cutting plane extending longitudinally of the assembly, the laminations of the longer sides of the flux path being formed from a thin sheet of magnetic material spirally wrapped, the laminations of the shorter sides of the flux path being formed from thin washers of magnetic material.

7. An electromagnetic clutch assembly including magnetic circuit means comprising a coil adapted to carry current therethrough, a driving clutch member and a driven clutch member magnetically linked with said soil so that the clutching faces of said members are in the flux path of the coil, a driven shaft, said driving and driven clutch members having at least a portion of each thereof of magnetic material, substantially the entire path of flux flow in said magnetic circuit being formed by thin laminations of magnetic material extending in the direction of flux flow, whereby magnetic eddy currents in said magnetic path are substantially reduced, said driven clutch member having a low moment of inertia consistent with obtaining a high relative flux path and being coupled to said driven shaft for rotational movement therewith but being free for translational movement with respect thereto.

8. An electromagnetic clutch and brake assembly including a magnetic coil, magnetic circuit means linking said coil, said circuit means including a tubular drive shaft having a portion rotating within the coil, said portion terminating in a clutch face, bearings mounted within said tubular drive shaft, a driven shaft mounted in said bearings, said driven shaft extending through said electromagnetic clutch assembly, a fixed bearing having a radially disposed pin projecting through the fixed bearing and the driven shaft, said pin having its ends projecting beyond the bearing, a slotted magnetic sleeve provided with axially extending and radially disposed slots into which the ends of said pin project, said slotted sleeve forming a part of the magnetic circuit and terminating in a clutch face adjacent the clutch face on the tubular drive shaft, said slotted sleeve being mounted for axial movement upon said fixed bearing away from and toward said tubular drive shaft, a brake lining positioned adjacent the end of said slotted sleeve opposite said clutch face, resilient means mounted on the driven shaft with one end of the resilient means fixed with respect to the driven shaft for biasing the slotted sleeve away from the tubular drive shaft so that when the magnetic coil is energized the slotted sleeve is drawn into engagement with the tubular drive shaft to thereby drive the slotted sleeve and the driven shaft, said resilient means actuating the slotted sleeve into engagement with the brake lining to arrest the rotation of the slotted sleeve and the shaft driven thereby when the coil is de-energized.

9. An electromagnetic clutch assembly including a magnetic coil, magnetic circuit means linking said coil, said circuit means including a tubular drive shaft having a portion rotating in the flux path of the coil, said portion terminating in a clutch face, a driven shaft extending through said electric clutch assembly, means for mounting said driven shaft concentrically with respect to the tubular drive shaft, a magnetic sleeve having a low moment of inertia consistent with obtaining a high relative flux path, means for mounting said sleeve for axial movement upon said driven shaft, said means including a spacing member mounted on the driven shaft for supporting the sleeve in spaced relation upon the driven shaft, said sleeve being non-rotatably attached to the driven shaft with free axial movement and having a clutch face adapted to engage the clutch face on the tubular drive shaft, said sleeve forming a part of the magnetic circuit, resilient means for biasing the sleeve magnetic flux generating means for overcoming the biasing effect of said resilient means and axially moving said armature member so as to cause engagement of said clutch faces.

20. A low torque precision electromagnetic clutch brake apparatus comprising a housing having a first and a second end portion enclosing said end thereof; a first shaft extending through said first end portion; means to prevent axial movement of said first shaft; a first magnetizable member extending from said first shaft and rotatable therewith; a first clutch face carried by said first magnetizable member; a second shaft coaxial with said first shaft, and extending through said first end portion; means to prevent axial movement of said second shaft; a pin member extending radially from said second shaft; a magnetizable armature member provided with a slot parallel to said second shaft adapted to receive said pin member, said armature member being free to move axially with respect to said second shaft and constrained to rotate therewith by said pin member; a second clutch face carried by said armature member, in confronting relationship to said first clutch face; a braking surface carried by said armature means; a frictional engaging surface supported within said housing in confronting relationship to said braking surface; resilient means biasing said armature apart from said first magnetizable member so as to (1) prevent engagement of said clutch faces and (2) place said braking surface into engagement with said frictional engaging surface; and electromagnetic flux generating means for overcoming the biasing effect of said resilient means and axially moving said armature member so as to cause (1) engagement of said clutch faces and (2) disengagement of said braking surface and said frictional engaging surface.

21. A low torque precision electromagnetic clutch apparatus comprising:
a housing having a first and a second end portion enclosing each end thereof,
a first shaft extending through said first end portion,
means to prevent axial movement of said first shaft,
a first magnetizable member extending radially from said first shaft and rotatable therewith,
a first clutch face carried by said first magnetizable member,
a second shaft coaxial with said first shaft extending through said first end portion,
means to prevent axial displacement of said second shaft,
a magnetizable armature member movable axially with respect to said second shaft and rotatable therewith,
a second clutch face carried by said armature member in confronting relationship to said first clutch face,
resilient means biasing said armature member,
and electromagnetic flux generating means for overcoming the biasing effect of said resilient means and axially moving said armature member.

22. The low torque precision electromagnetic clutch apparatus of claim 21, including a braking surface carried by said armature means and a frictional engaging surface supported within said housing in confronting relationship to said braking surface, said resilient means and electromagnetic flux generating means cooperating to alternately cause (1) engagement of said clutch faces and (2) engagement of said braking surface with said frictional engaging surface.

23. The low torque precision electromagnetic clutch apparatus of claim 21, including a pin member extending radially from said second shaft, and said magnetizable armature member being provided with a slot parallel to said second shaft adapted to receive said pin member, said armature member being free to move axially with respect to said second shaft and constrained to rotate therewith by said pin member.

24. The low torque precision electromagnetic clutch apparatus of claim 23, including a braking surface carried by said armature means and a frictional engaging surface supported within said housing in confronting relationship to said braking surface, said resilient means and electromagnetic flux generating means cooperating to alternately cause (1) engagement of said clutch faces and (2) engagement of said braking surface with said frictional engaging surface.

References Cited by the Examiner

UNITED STATES PATENTS

| 754,291 | 3/1904 | Eastwood | 192—84 |
| 2,401,003 | 5/1946 | Lear | 192—84 X |
| 2,490,044 | 12/1949 | Garbarini et al. | 192—84 |
| 2,511,693 | 6/1950 | Burghoff | 175—21 |
| 2,531,916 | 11/1950 | McKinney | 175—21 |
| 2,801,720 | 8/1957 | Bachman | 192—84 X |
| 2,840,205 | 6/1958 | Linke | 192—84 X |
| 2,859,845 | 11/1958 | Bachman | 192—18.2 |

FOREIGN PATENTS 561,023  5/1944  Great Britain.

FRED C. MATTERN, Jr., *Primary Examiner.*

THOMAS J. HICKEY, ROBERT C. RIORDON, DAVID J. WILLIAMOWSKY, MILTON KAUFMAN, *Examiners.*

M. POLLACK, G. V. LARKIN, H. C. COE,
*Assistant Examiners.*